Dec. 5, 1950
D. J. NEALE
2,533,137
CABLE TERMINAL
Filed Oct. 8, 1945
2 Sheets-Sheet 2
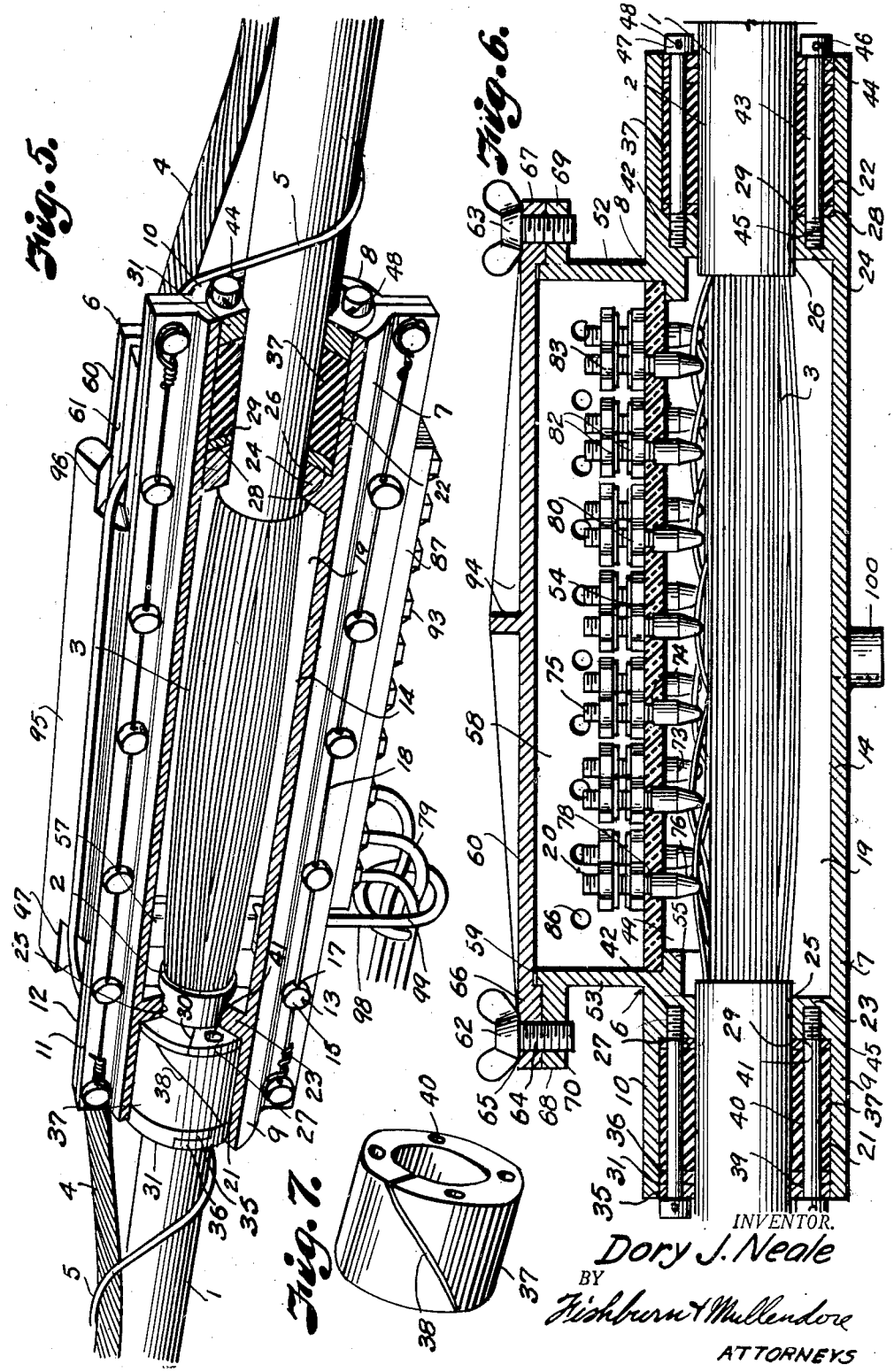
INVENTOR.
Dory J. Neale
BY
Fishburn & Mullendore
ATTORNEYS Patented Dec. 5, 1950

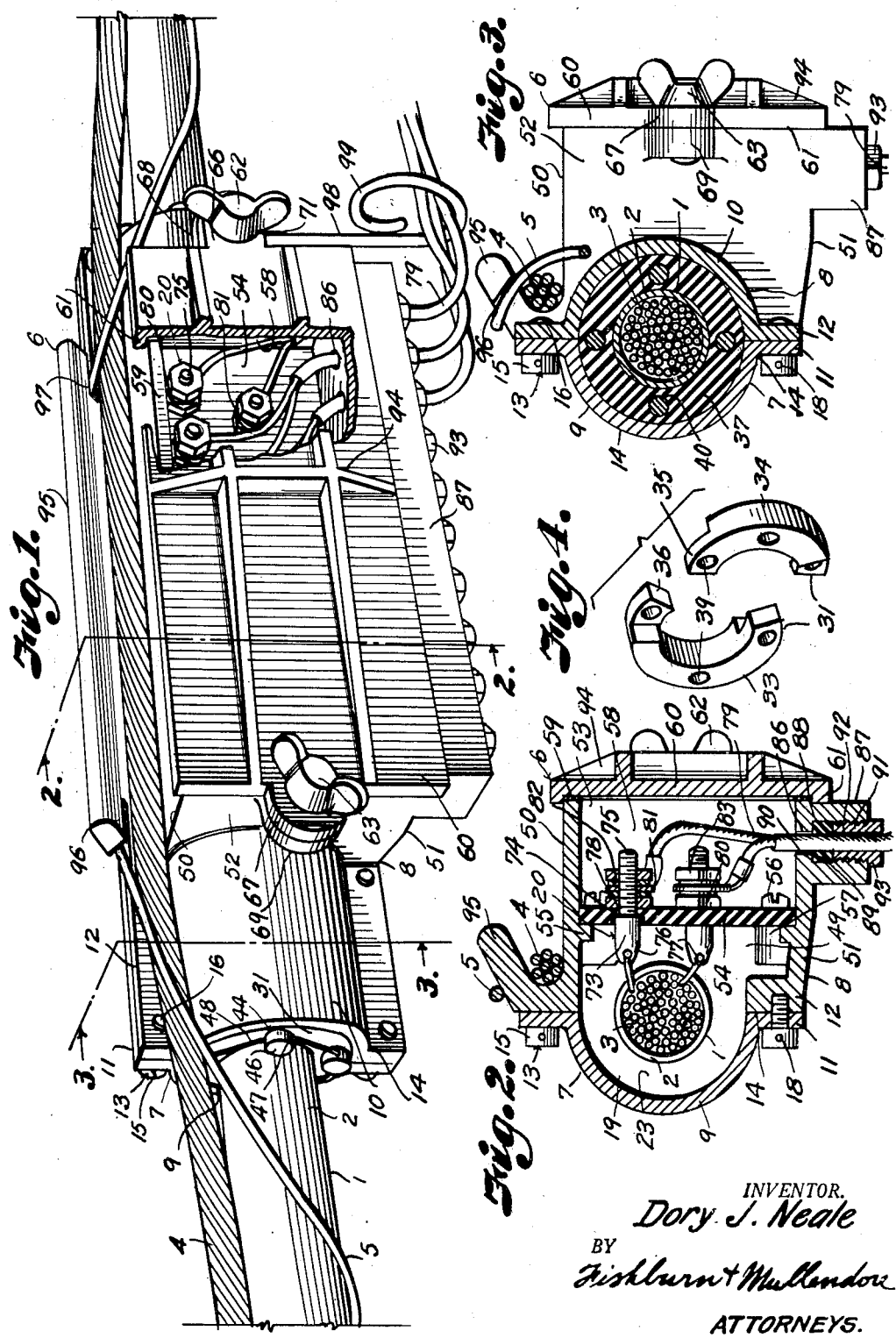

2,533,137

UNITED STATES PATENT OFFICE 2,533,137

CABLE TERMINAL

Dory J. Neale, Topeka, Kans.

Application October 8, 1945, Serial No. 620,968

1 Claim. (Cl. 285—194)

This invention relates to a cable terminal for making service connections with telephone or similar lines contained within the cable and has for its principal object to provide a terminal that is readily applied to a cable and all connections made without the necessity of solder joints.

Other objects of the invention are to provide gas-tight connections where gas is used in a cable and to exclude moisture, dust and other elements likely to interfere with operation of the cable circuits; to provide a cable terminal having separate cable and service compartments whereby service connections can be made at any time within the service compartment without opening the cable connection compartment; to provide a cable terminal adapted for support on the cable messenger; and to provide a cable terminal wherein an anchorage on the messenger is maintained by the lashing wire which secures the cable to the messenger.

In accomplishing these and other objects of the invention hereinafter pointed out, I have provided improved structure, the preferred form of which is illustrated in the accompanying drawings wherein:

Fig. 1 is a perspective view of a cable equipped with a terminal constructed in accordance with the present invention.

Fig. 2 is a cross section through the terminal on the line 2—2 of Fig. 1.

Fig. 3 is a cross section on the line 3—3 of Fig. 1, particularly illustrating the sealing elements for maintaining a gas-tight connection between the sheath of the cable and the cable terminal.

Fig. 4 is a perspective view of the parts of the packing glands shown in spaced relation.

Fig. 5 is a perspective view of the cable terminal from the side opposite to that shown in Fig. 1, with a part being shown in longitudinal section to better illustrate the cable connecting compartment and the sealing elements at the ends thereof.

Fig. 6 is a horizontal section through the cable terminal.

Fig. 7 is a perspective view of one of the packing elements.

Referring more in detail to the drawings:

1 designates an ordinary telephone cable including a sheath 2 containing a plurality of circuit wires 3 which connect subscribers' telephones with various exchanges in a telephone system. The cable 1 is supported from a messenger 4 by a wire lashing 5 applied spirally around the cable and messenger in accordance with the present practice. At various stations along the length of the cable it is necessary to make connections with the wires 3. The methods of making such connections prior to the present invention involved solder joints and required considerable time and skilled workmanship; however, the cable terminal constructed in accordance with the present invention and designated 6 on the drawing, is readily applied without the necessity of solder connections or joints.

The terminal 6 includes a housing having two main sections 7 and 8, each having semi-cylindrical walls 9 and 10 provided with coextensive flanges 11 and 12 on the opposite edges that are secured together by fastening devices 13 to form a sleeve-like body 14 of larger inner diameter than the outer diameter of the cable sheath. The fastening devices 13 have heads 15 for engaging the outer side of one of the flanges and threaded shanks 16 adapted to be threaded into registering openings in the flanges for drawing the sections together and close the joint therebetween. The heads 15 are preferably provided with transverse openings 17 through which sealing wires 18 are extended to prevent accidental displacement of the fastening devices. The sections are of sufficient length to form a compartment 19 in which the wires 3 are exposed for connection with binding posts 20 later described and to provide packing compartments 21 and 22 at the ends thereof for receiving the packing elements later described. The compartments 21 and 22 are separated from the compartment 19 by internal flanges 23 and 24 and which when the sections are together form openings 25 and 26 to snugly engage the ends of the cable sheath as shown in Fig. 5. The packing elements include spit washers 27 and 28 adapted to seat against the outer faces 29 of the respective flanges 23 and 24 with the abutting ends 30 (Fig. 5) of the washer sections staggered with respect to the joint between the housing sections 7 and 8.

The washers 27 and 28 cooperate with the washer-like glands 31 to retain packing 32 therebetween. The glands 31 are formed of substantially semi-circular sections 33 and 34 as shown in Fig. 4. The ends of the sections are shaped to provide tongues 35 on one section adapted to overlap similar tongues 36 on the other section when the sections are brought together about the cable as later described. The packings constitute a resilient sleeve 37 having an inner diameter substantially corresponding with the outer diameter of the cable sheath and an outer diameter corresponding with the inner diameter of the compartments 21 and 22 respectively. To permit application of the sleeves, the side wall thereof is provided with a bias cut 38 whereby the sleeves may be opened to pass them over the cable as later described. In order to compress the packing and effect a gas-tight, solderless seal about the sheath of the cable and the inner circumference of the compartments 21 and 22, the packing glands 31, packing sleeves and split washers 28 are provided with registering apertures 39, 40 and 41 respectively which are adapted to be registered with internally threaded sockets 42 in the internal flanges 23 and 24. Extending through the registering openings are shanks 43 of cap screws 44 having threaded terminals 45 adapted to engage in the internally threaded sockets 42 and heads 46 adapted to engage against the outer face of the packing glands 31. As previously stated, the openings are so arranged that when the packings are assembled the joints between the washer sections and the bias cut in the packing sleeves, as well as the joint between the terminal sections, are staggered with respect to each other as best indicated in Fig. 5. The heads of the cap screws 44 are also provided with transverse openings 47 to receive wires 48.

A portion of the compartment 19 in the terminal section 7 has a substantially rectangular extension 49 formed by providing the section 7 with laterally extending upper and lower walls 50 and 51 and end walls 52 and 53 adjacent the internal flanges 23 and 24. The rectangular side of the compartment 19 is closed by a partition plate 54 which seats against an internal marginal flange 55 projecting inwardly from the walls 50—51 and 52—53 as best shown in Figs. 2 and 6. The partition 54 is preferably formed of insulating material and is retained in sealing contact with the marginal flanges by fastening devices 56 having shanks thereof extending through the partition plate and engaged in threaded sockets formed within bosses 57 formed within the terminal section 7 as shown in Fig. 2. The walls 50—51 and 52—53 project outwardly from the partition plate to form a service connecting compartment 58 wherein service wires may be connected with the binding posts 29 without opening up the compartment 19. The walls forming the compartment 58 terminate at their outer edges in a seat 59 for a cover plate 60 to close the outer side of the compartment. The cover plate 60 is preferably provided with a marginal flange 61 adapted to overlap the outer sides of the compartment walls as shown in Figs. 2 and 5, whereby the cover is placed in position and secured by fastening devices 62 and 63 at the respective ends thereof. In the illustrated instance, the fastening devices 63 are shown as thumb screws having threaded shanks 64 extending through openings 65 provided in ears 66 and 67 extending from the ends of the cover plate.

Cooperating with the ears 66 and 67 are ears 68 and 69 which extend outwardly from the end walls 52 and 53 and provided with threaded openings 70 registering with openings 64 to receive the terminal ends of the thumb screws as shown in Fig. 6.

To facilitate attachment of the cover one of the ears thereof may be provided with a slot 71 extending outwardly from the opening therein to form a hook engaging with the thumb screw at that end of the cover. With this arrangement, it is only necessary to release the thumb screws sufficient for the flange 61 of the cover to clear the walls of the connecting compartment whereupon the cover may be swung laterally to disengage the hook from the thumb screw 62 while the other end of the cover is maintained in pivoted connection with the thumb screw 63.

The binding posts 20 have heads 73 forming annular shoulders 74 with threaded shanks 75. The heads 73 are tapered as at 76 and transversely slotted as at 77 to receive a circuit wire 3 which is clamped therein by bending the portions of the head inwardly to constrict the entrance side of the slot and form an electrical connection with the circuit wires as later described.

The binding posts are mounted in openings 78 of the partition plate, the openings being arranged in upper and lower rows with the openings in one row staggered with respect to the openings in the other row so that the binding post are spaced to facilitate connection of the service wires 79. The openings 78 at the ends connecting with the compartment 58 closely engage the threaded shanks of the binding posts but the opposite sides are counterbored to provide an annular seat for the shoulders 74 of the heads 73. The heads of the binding posts are drawn into sealing contact with the respective shoulders by nuts 80 threaded on the shanks of the binding posts as shown in Figs. 2 and 6. The service wires may have washer-like terminals 81 sleeved over the threaded posts between washers 82 which are clamped thereagainst by draw nuts 83 threaded on the binding posts as shown in Fig. 2. The outlets for the service wires 79 are provided by a series of openings 86 formed in the lower wall 51 and in an integral rib 87 projecting downwardly and extending along the length thereof. The openings 86 are counterbored as at 88 to receive sealing disks or washers 89 which are retained in sealing contact with shoulders 90 by bushings 91. The bushings 91 have openings 92 for passing the service wires 79 therethrough and have threads engaging threads in the outer portions of the counterbore openings. The bushings have polygonal-shaped heads 93 by which they may be readily engaged by a wrench or the like to screw the bushing into and out of position. The cover for the service connection compartment may be formed of relatively light material and suitably reinforced on the exterior side by ribs 94. In order to anchor the terminal for support by the messenger, the upper flange for the section 6 has an upwardly extending wing 95 adapted to engage between the messenger 4 and lashing wire 5 as shown in Figs. 1, 2 and 5. The ends of the wing have slots 96 and 97 to receive the lashing therein whereby the lashing is prevented from slipping over the top of the wing.

If desired, one end of the terminal may be provided with a bracket 98 having a ring-shaped terminal 99 through which the service wires 79 may be passed and suitably secured as in customary practice.

In applying the terminal to a cable, the sheath 2 of the cable 1 is cut at points spaced apart a distance somewhat less than the space between the flanges 23 and 24. The section of the sheath between the points of cut is removed to expose the wires 3. The wing 95 on the housing section 8 is then inserted between the lashing wire and the messenger so that the lashing wire enters the slots 96 and 97. The housing section 8 is then swung to a position so that the cable 1 seats within the flanges 23 and 24 thereof. Selected wires 3 are then separated from the bundle of wires in the cable and secured to their respective binding posts 20. This is effected by removing the insulation where the wire is in position to cross the selected post and sliding the wire into the slot 77 of that post, after which the portions of the post on the respective sides of the slot are pinched together to grip the wire and form an electrical connection therewith. The housing section 7 is then applied so that the flanges 11 thereon seat against the flanges 12 with the openings in the flanges in registry. The fastening devices 13 are then applied to draw the sections into sealing contact and the flanges 24 and 25 into contact with the sheath 2 of the cable 1.

The sealing wires 18 are then passed through the fastening devices 17 as shown in Fig. 5. The sectional washers 27 and 28 are then applied over the cable and moved together to form washers therearound which are pushed within the open ends of the packing compartments so that they seat against the outer faces of the internal flanges 23 and 24, care being taken to see that the openings 41 register with the threaded sockets 45 in the flanges. The rubber sleeves 37 are then spread apart so that the bias-shaped ends thereof will pass over the cable. The sleeves are then pushed into the packing compartments 21 and 22 with the openings 40 therein registering with the openings 41. The gland rings 31 are then assembled about the cable and passed into the packing recesses so that the openings 39 therein register with the openings 40 in the packing sleeves. The fastening devices 44 are then inserted so that the shanks 43 project through the registering openings and are turned to screw the threaded ends 42 into threaded sockets 45 until the heads 46 draw the gland rings 31 into pressing contact with the packing sleeves 37. Pressure of the gland rings presses the packing sleeves into sealing contact with the cable sheathing 2 and into sealing contact with the wall of the packing chambers 21 and 22 so as to form gas-tight joints therebetween. The wires 48 are then passed through the openings 47 in the heads 46 of the fastening devices and the ends of the wires secured together as shown in Fig. 1.

When the terminal is assembled on the cable as described the cable compartment 19 thereof is gas-tight and is in communication with the interior of the cable so as to retain the gas ordinarily used in such cables.

When it is desired to connect service wires 79, the cover 60 is removed by loosening the wing nuts 62 and 63 so that the flanges 61 on the cover will clear, after which the hook ear 66 of the cover is swung away from the thumb screw 62, while the cover pivots on the other thumb screw 63. Removal of the cover exposes the stem ends of the binding posts 20. Since the openings 86 have been closed by compressible disks (not shown), it is necessary to remove such disks, through which the service wires are to be projected. This is effected by removing the bushing 91 and then the disk. Compressible washers 89 are then sleeved over the ends of the service wires and the ends of the service wires project through the openings 86 so that the washers seat upon the shoulders 90, the bushings 91 having previously been threaded over the service wires. The service wires are then secured to the proper binding posts 20. The resilient washers 92 are then tightened about the service wires upon insertion of the bushings 91 so as to form a gas-tight seal therearound. If desired, the service wires may be laid within the ring 99 and secured by suitable clamps (not shown).

Since gas is used in the cables this gas may be inserted through a suitable connection indicated at 100 (Fig. 6). After the service wires are connected the cover is re-applied to complete assembly.

From the foregoing it is obvious that I have provided a cable terminal that is of simple construction and readily applied without the use of solder joints.

It is also obvious that the terminal when installed in gas-tight and leak-proof from all exterior elements.

What I claim and desire to secure by Letters Patent is:

A cable connector including a housing composed of mating sections adapted to be assembled about a cable, each section having semi-circular ends cooperating to provide cylindrical sockets, internal flanges on said sections defining bottoms for said sockets, said sockets being adapted to encircle a cable, said flanges having internally threaded openings therein, fastening means securing said sections together, resilient cylindrical sleeves having bias slits disposable about a cable within said sockets, said sleeves having longitudinal openings in registry with said threaded openings, washers comprising circular segments adapted to be assembled about the cable and disposed within the sockets in following relation with respect to the resilient sleeves and having openings registering with the longitudinal openings in said sleeve, said segments having overlapping ends, and headed fastening means engaging the segments and including threaded shanks extending through said registering openings and distorting said sleeve into sealing contact between said cylindrical sockets and the cable.

DORY J. NEALE.

REFERENCES CITED

The following references are of record in the file of this patent:

UNITED STATES PATENTS

| Number | Name | Date |
| --- | --- | --- |
| 965,684 | Bierce et al. | July 26, 1910 |
| 1,260,998 | Black | Mar. 26, 1918 |
| 1,420,217 | Richards | June 20, 1922 |
| 1,680,940 | Emmons | Aug. 14, 1928 |
| 1,862,811 | Strong | June 14, 1932 |
| 1,917,242 | Emmons | July 11, 1933 |
| 2,297,824 | Bissell | Oct. 6, 1942 |
| 2,299,607 | Auerbach | Oct. 20, 1942 |
| 2,361,215 | Lamberger | Oct. 24, 1944 |

FOREIGN PATENTS

| Number | Country | Date |
| --- | --- | --- |
| 850,004 | France | Aug. 28, 1939 |